May 6, 1958 L. O. PARKER 2,833,068

RECORDING AND REMINDING DEVICE IN DISC FORM

Filed Nov. 17, 1953 2 Sheets-Sheet 1

INVENTOR.
LEON O. PARKER
BY A. Donham Owen
ATTORNEY

RECORDING AND REMINDING DEVICE IN DISC FORM

Filed Nov. 17, 1953 2 Sheets-Sheet 2

INVENTOR.
LEON O. PARKER
BY A Durham Owen
ATTORNEY

United States Patent Office 2,833,068

Patented May 6, 1958

2,833,068

RECORDING AND REMINDING DEVICE IN DISC FORM

Leon O. Parker, San Francisco, Calif.

Application November 17, 1953, Serial No. 392,627

5 Claims. (Cl. 40—113)

This invention relates to an improved reminder and record-making device. This application is a continuation-in-part of application Serial No. 191,562, filed October 23, 1950.

The invention is especially useful in keeping track of regular duties, tasks, or chores. It solves problems such as how to know whether each of several doses of medicine has been taken each day, a thing which many people have found difficult to remember because of the recurrence of a large number of identical operations. It is usually inconvenient to keep a written record, and most people will not keep one. Even if a pencil and chart are kept with the medicine, most people fail to keep up the chart because they don't want to take the time, and if either the pencil or the chart gets misplaced, they are even less likely to keep it up.

The invention also solves the problem of how to keep track of the feeding schedule of pets. When there are several persons in a household, sometimes each of them feeds the pet, so that it suffers from over-feeding. At other times, each of them thinks that someone has already fed the pet, in which event the pet goes hungry.

The present invention solves these problems by providing a reminder system and a record that is made without writing by simply tearing off one or more tabs to indicate the performance of some operation. No additional equipment besides the recording device is required, and the device may be put with the container for the pet food or the medicine, or it may be secured directly to the container. Furthermore, the device can be made up to suit any particular type of calendar and any type of performance pattern.

A feature of this invention is the novel and practical assembly of the device from a few stock parts, made possible by a novel interlock of the parts.

Basically the invention includes a plurality of tabbed discs of paper, secured together, preferably in an envelope or cape, so that the corresponding tabs of all the discs are aligned and overlie each other. The record is made by tearing off a tab so as to leave a stub, and the stub serves as the record that the thing has been done. The size or shape of the stub may be varied, to indicate, for example, whether the operation was actually done or whether it was omitted, or which one of two different choices was taken, and the stub itself may be removable.

Other features and advantages of the invention will be described in detail with reference to the accompanying drawings in accordance with 35 U. S. C. 112. However, it is to be understood that the details are not intended to limit the invention, the scope of which is defined in the appended claims.

Figure 1:
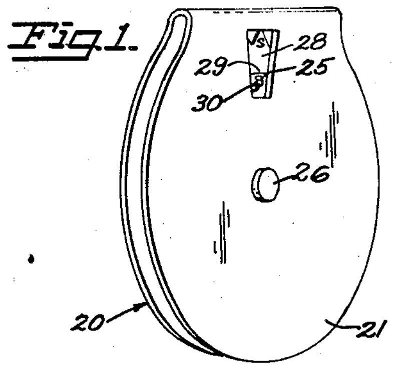
Fig. 1 is a view in perspective of a record-making reminder embodying the principles of the invention.
Figure 2:
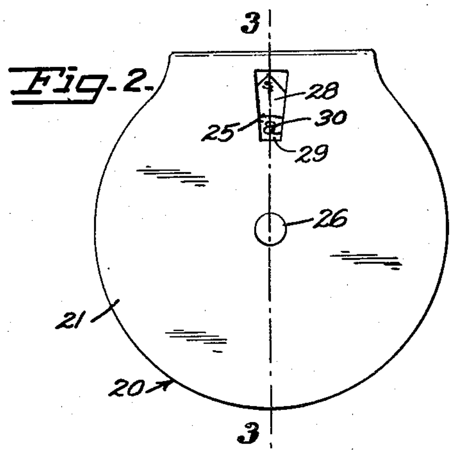
Fig. 2 is a view in front elevation of the reminder of Fig. 1.
Figure 3:
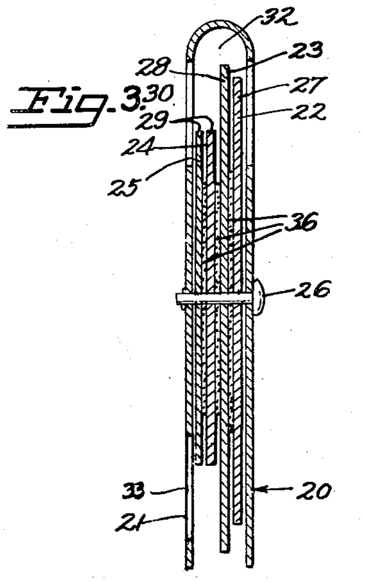
Fig. 3 is a view in section taken along the line 3—3 in Fig. 2. The thicknesses have necessarily had to be exaggerated for purposes of illustration, so that the scale is inaccurate.
Figure 6:
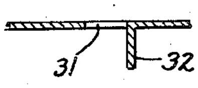
Fig. 6 is a fragmentary view in section taken along the line 6—6 in Fig. 5.

One form of recording reminder 20 is shown assembled in Figs. 1 to 4. The reminder 20 comprises a cover 21, generally circular in shape enclosing a plurality of tabbed discs 22, 23 and untabbed discs 24, 25 of paper or other easily torn material, which revolve about a rivet or spindle 26. The number of discs depends on the number of operations to be performed each day, and the number of tabs formed on each disc depends on the number of days for which the reminder 20 is to be used. For purposes of illustration, let us assume that we are going to keep track of two operations each day. For example, suppose that medicine is to be taken twice a day or that a dog is to be fed twice a day. Let us also assume that the record is to be kept for five weeks, while each forward disc 24, 25 is made up in stock for a five-week period. There may then be two tabbed discs 22, 23, each disc with thirty-five tabs, 27, 28, respectively. The initial letters of the days of the week may be printed serially on all the tabs 27, 28. There will also be two untabbed discs, 24, 25, with segments 29 giving the days of the month. There may be thirty-five segments 29 on each (always the same number as the number of tabs) four of which are blank, and the others are numbered 1 to 31. For months of fewer days, the unneeded numbers may be torn off. The four discs are aligned and glued together, as shown in Fig. 3 and as explained in detail below.

To make it easier to identify the different discs, each of them may be made from different colors of paper. For example, the front disc 25 may be yellow, the second disc 24 may be blue, the third disc 23 may be orange, and the fourth disc 22 may be green. Instead of this or in addition to it, the number "1" may be printed on each tab 27 of the forward tabbed disc 23 and the number "2" on each tab 18 of the disc 23. Preferably the different rows of tabs extend to different heights. For example, as in Fig. 3, the forward tabbed disc 23 may have the longer tabs 18 and the rear disc 22 may have shorter tabs 17.

The reminder 10 is especially well adapted to assembly on the spot, by a pharmacist, for example. The pharmacist may have, in stock, covers and discs of different colors and heights, and portions of these may have gummed bases so that they may be assembled simply after moistening.

Figure 5:
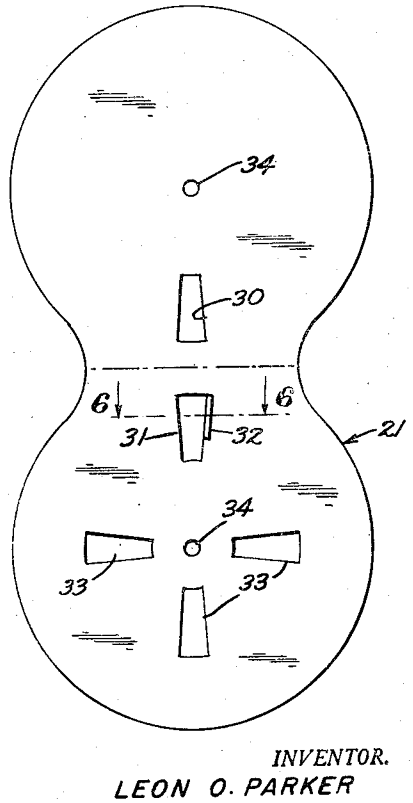
Fig. 5 is a view in front elevation of the interior of the open cover.
Figure 4:
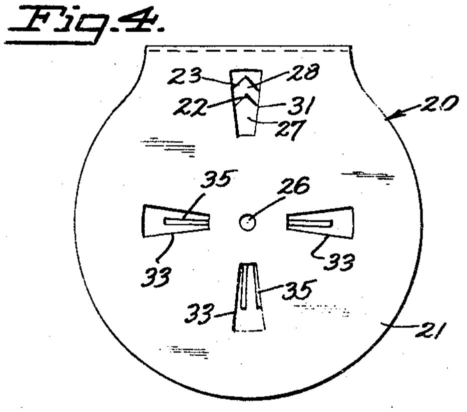
Fig. 4 is a view in rear elevation of the same reminder.

All the covers 21 may be the same size in any one stock assortment. The cover member 21 is preferably a one piece member folded over, as shown (Figs. 5 and 2). Each cover 21 (see Figs. 2, 4 and 5) has a front window 30 through which the disc insignia are viewed, a top rear window 31 aligned therewith and provided with an aligning tab 32, secured to one edge of the window 31 only, and other rear windows 33 that aid in rotating the discs. The tab 32 is folded along the edge of the window 31 to stick out perpendicularly during assembly of the reminder. It may be perforated so that it can be torn off after assembly is completed. Central grommets 34, 34 may also be provided to accommodate the spindle 26.

Figures 7, 8, 9, 10, 11, 12, 13, 14, 15:
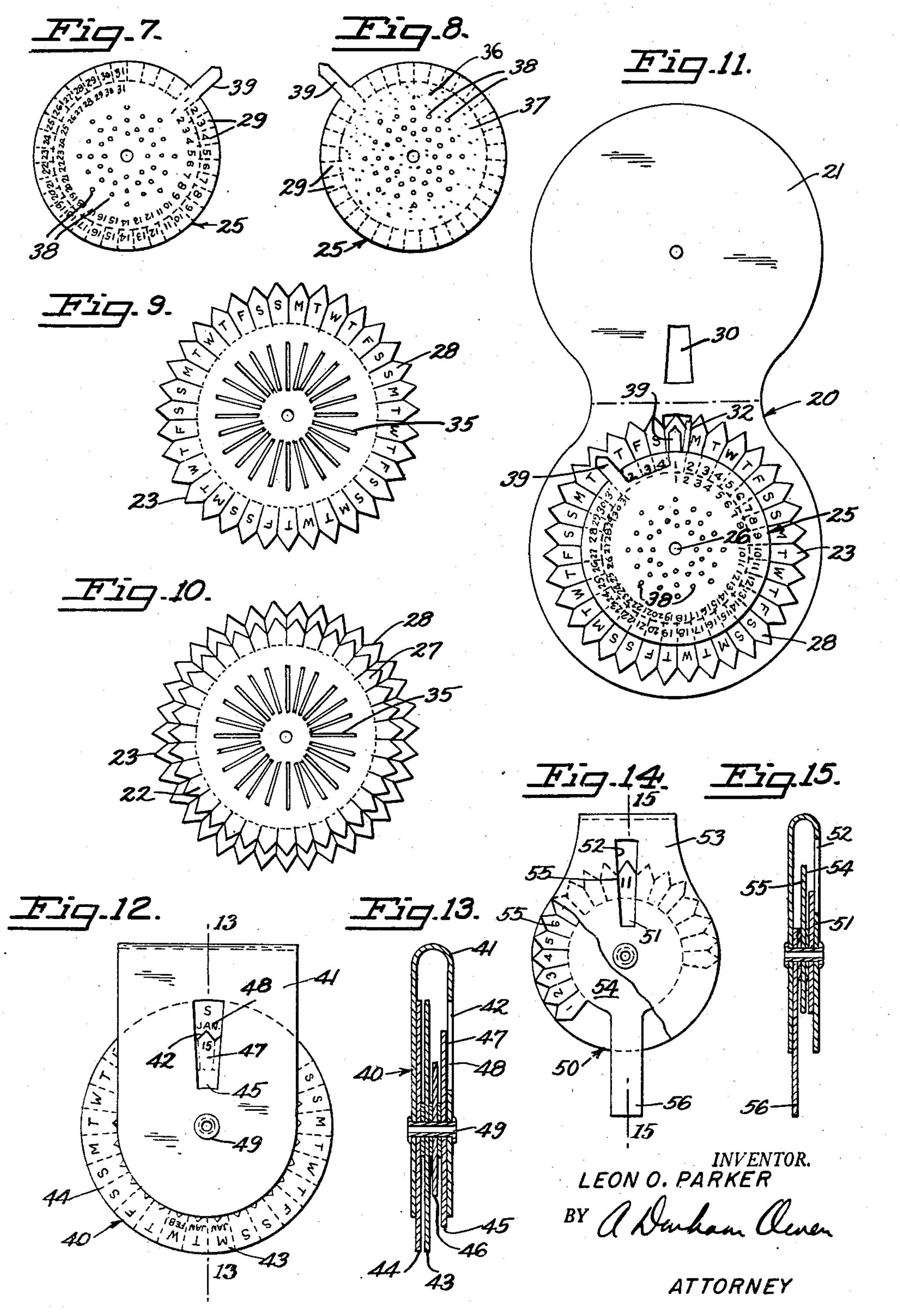
Fig. 7 is a view in front elevation of one of the tabbed discs having the days of the month thereon.
Fig. 8 is a view in rear elevation of the disc of Fig. 7.
Fig. 9 is a view in front elevation of a disc having tabs with indicia for the days of the week.
Fig. 10 is a view in rear elevation of the disc of Fig. 9.
Fig. 11 is a view in front elevation of the assembly, with the cover open, showing how the discs are aligned with the cover.
Fig. 12 is a view in front elevation of a modified form of the invention.
Fig. 13 is a view in section taken along the line 13—13 in Fig. 12.
Fig. 14 is a view in front elevation of another modified form of the invention.
Fig. 15 is a view in section taken along the line 15—15 of Fig. 14.

The tabbed discs 22, 23 are alike except for diameter and effected length of tabs 27, 28. As shown in Figs. 9 and 10, each disc 22, 23 has radially extending tabs, 27, 28. In this case thirty-five are shown to correspond with five weeks. There may be more or fewer. Preferably they are printed "S," "M," "T," "W," etc., to indicate, serially, the days of the week. The discs also have spoke-like slits 35 which may be engaged by the thumb nail through the rear cover windows 31, 33 for revolving the discs. An annular area 36 on the rear side of the discs 23, 24, 25 may be gummed, or the discs 22, 23 may be glued together at the time of manufacture.

The untabbed discs 24, 25 (see Figs. 7 and 8) have perforated segments 29 that may be torn away to conform them to the period desired. In this instance thirty-five segments are provided, of which thirty-one are numbered serially to indicate the days of the month, and four are blank. Annular areas 37 are gummed or otherwise provided with adhesive, and there may be openings 38 for water to pass through them to moisten the glue 36. Each disc 24, 25 has a handle 39.

In assembly, the discs 22, 23 are placed on the spindle and keyed by the aligning tab 32 (which is placed between the first and second days of the period) so that the day which begins the period appears in the front window 30. Similarly the discs 24, 25 are placed on the spindle and aligned so that the first day on the top disc 24 appears in the window. The second disc is aligned so that its segment #1 immediately follows the segment on the top disc representing the last day of that particular month (whether that is 28, 29, 30 or 31). Dates earlier than the first day of the period are torn off the top disc, as are the blank segments. Then the two discs 24, 25 together represent a continuous calendar period.

The glue 36 may then (if not earlier) be moistened through the openings 37, 38 and when the discs are all glued together, the assembly is complete. Then the aligning tab 32 may be torn off and discarded.

Suppose that the reminder is to be used to record the taking of medicine: When the patient takes his first dose on a particular day, he tears off the tab 27 on the disc 24 that is immediately above that day, as indicated on the disc 22. The fact that the tab 27 has been torn off will then indicate to him and to his doctor that the first dose has been taken, and he will not have to speculate whether he has yet taken it. Later, when he looks at the reminder 20 he will see that he has taken the first dose but not yet taken the second; so when it is time, he takes the second dose and tears off the next tab 28, thereby making the record that the second dose has been taken and leaving only the stubs and bases, which are united, which fact indicates that all the doses for that particular day have been taken. If he skips a dose, he would not tear off a tab, and the fact that the tab remains will indicate no dose was taken.

A modified form of the invention is shown in Figs. 12 and 13. The reminder 40, circular in form, has a case or folder 41 with a window 42 that partially encloses the reminder discs. The case 41 helps to make the reminder more attractive, and the directions and advertising may be printed on it. Each of the reminder discs is constructed with a plurality of tabs with a circular concentric line of perforations that forms the base for all its tabs.

Two rear discs 43 and 44 may be used to indicate the calendar period and dates, where the period extends over part of each of two months. For example, in the drawings, the period extends from January 15 to February 15. The January disc 43 is secured on top of (in front of) the February disc 44. It is set to begin on January 15 (when the patient is to begin taking this particular medicine) by tearing off the tabs for all the days between January 1 and January 14. Then February 1 on the disc 44 is aligned to follow January 31, or in other words to be directly below where January 1 was before it was torn off. The discs 43 and 44 are then adhesively secured together in this position. In this way the pharmacist can make up any desired calendar from a stock of twelve kinds of discs, one for each month.

Suppose that two doses are to be taken each day. Then there will be two smaller forward discs 45 and 46, each of which has radial tabs 47 and 48 to correspond to and align with the date tabs on the larger calendar disc. These tabs 47 and 48 may have numbers printed on them to indicate the day of the month. So long as the discs 45 and 46 are constructed concentrically with the outer discs 43 and 44 and with the same number of equally spaced tabs 47 and 48, all that need be done to adjust the two sets of discs is to adjust one day and all other days will fall into proper place. Thus if January 15 falls on a Sunday and the calendar is so adjusted, all the days in January and in February will also be in proper place. The calendar then reads for any month beginning with any day of the month, and is continuous for twenty-eight, twenty-nine, thirty, or thirty-one days from there. If the month has fewer than thirty-one days, some of the tabs are simply torn off and the discs are aligned accordingly.

All of the discs 43, 44, 45, and 46 turn together as a unit, around the center spindle 49 because they are glued together near the center. The user turns the calendar forward each day so that the proper day appears in the window 42. When he has taken his first dose, he tears off a tab 47 on the first smaller disc 45, and then the second tab 48 on the disc 46 is exposed. There may be two, three, or any number of such forward smaller discs, and in each case when one tab is torn off, the tab next underneath is exposed. The tabs may also be arranged in the opposite order, with the tallest tabs in the rear. Again, each time the tab is torn off, the remaining stub forms a record to show that the dose was taken.

In the modified disc-type reminder 50 shown in Figs. 14 and 15 a shorter period is provided for. Here a small disc 51 indicates the days of the week through a window 52 in a cover 53. A large disc 54 has peripheral tabs 55 on which the days of the month may be printed; or the printing may be arranged vice versa (as it may be in each modification which has been discussed). By having the inner disc 51 divided so as to indicate a certain number of complete weeks, it can be superimposed and aligned with any calendar arrangement to read correctly when the outer disc is in place. The two discs may be glued in place by a suitable adhesive; for example, they may be pre-gummed so that all the pharmacist has to do is to moisten them. As in other examples that have been discussed, there may be more than one tabbed disc, like the disc 54, of different radii. A handle 56 may also be glued on to the rear of the disc assembly and used to turn the discs 51 and 54 so that the proper tab for the proper day will appear in the window 52. If desired, the name of the month may be printed on the handle.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A reminder and record-making device comprising a first paper disc having radially extending divisions keyed to a calendar, and a plurality of other paper discs secured concentric to said first disc and having radially extending separable and removable tab portions, radially in line with said first disc's keyed divisions but at a different distance from the center, the tab portions of different said other discs being of different radial length and aligned with each other and with said divisions, the central portions of said discs being provided with adhesive by which they may be secured together, said discs also being provided with holes through which water can pass and moisten the adhesive after the discs are aligned and held together, whereby removal of a tab portion from said second disc may indicate the performance of an act on the date indicated on the adjacent division of the other disc.

2. A reminder and record-making device comprising a pair of paper discs having radially extending divisions keyed to a calendar and secured together to cover a series of consecutive days, some lying in one month and some lying in another month, the divisions of the front such disc covering the days not in the period having been removed so that the corresponding days of the second month on the rear disc are visible, and a third disc secured concentric to said pair of discs and having radially extending separable and removable tab portions, radially in line with the keyed divisions of said pair of discs but at a different distance from the center, whereby removal of a tab portion from said third disc may indicate the performance of an act on the date indicated on the adjacent division of one of said pair of discs.

3. A reminder and record-making device including in combination a plurality of paper discs adhesively secured together in overlying relation, some of said discs having a plurality of separable spaced removable index tabs projecting beyond the periphery of other discs; index members around said other discs aligned with said tabs and separable from their said discs; a cover folded over said discs and provided with a front window therethrough, a rear window aligned with the front window, and an aligning tab secured to one side only of said rear window so that said tab can be bent forward for alignment of said discs during assembly of said device; and journal means for rotating said discs in said cover so that one index tab and one index member appear in said window at a time.

4. A reminder and record-making device comprising a first paper disc having radially extending divisions keyed to a calendar and a plurality of second discs secured concentric to said first disc and having radially extending separable and removable tab portions, radially in line with said first disc's keyed divisions but at a different distance from the center, the tab portions of different discs being of different radial length and aligned with each other and with said divisions, the central portions of said discs being adhesively secured together, whereby removal of a tab portion from said second disc may indicate the performance of an act on the date indicated on the adjacent division of the other disc.

5. A reminder and record-making device comprising a pair of paper discs having radially extending divisions keyed to a calendar and adhesively secured together to cover a series of consecutive days, some lying in one month and some lying in another month, those divisions of the front such disc covering the days not in a chosen period having been removed to render visible the corresponding days of the second month on the rear such disc, and a third disc adhesively secured concentric to said pair of discs and having radially extending separable and removable tab portions, radially in line with said first disc's keyed divisions but at a different distance from the center, whereby removal of a tab portion from said third disc may indicate the performance of an act on the date indicated on the adjacent division of one of said pair of discs.

References Cited in the file of this patent

UNITED STATES PATENTS

| | | |
|---|---|---|
| 258,897 | Cussons | June 6, 1882 |
| 485,967 | Mosher | Nov. 8, 1892 |
| 553,996 | Moore | Feb. 4, 1896 |
| 734,991 | Sterki | July 28, 1903 |
| 737,049 | Walker | Aug. 25, 1903 |
| 1,874,201 | Mathers | Aug. 30, 1932 |
| 2,288,386 | Belden | June 30, 1942 |
| 2,549,419 | Callahan | Apr. 17, 1951 |

FOREIGN PATENTS

| | | |
|---|---|---|
| 19,138 | Great Britain | Sept. 8, 1898 |
| 565,290 | Great Britain | Nov. 3, 1944 |